(12) United States Patent
Bresch-Pietri et al.

(10) Patent No.: US 9,109,522 B2
(45) Date of Patent: Aug. 18, 2015

(54) METHOD OF CONTROLLING AN EGR VALVE INTEGRATED IN AN EGR CIRCUIT OF A COMBUSTION ENGINE

(71) Applicant: IFP Energies nouvelles, Rueil-Malmaison Cedex (FR)

(72) Inventors: Delphine Bresch-Pietri, Vincennes (FR); Thomas LeRoy, Saint Germain en Laye (FR); Jonathan Chauvin, Paris (FR)

(73) Assignee: IFP ENERGIES nouvelles, Rueil-Malmaison Cedex (FR)

( * ) Notice: Subject to any disclaimer, the term of this patent is extended or adjusted under 35 U.S.C. 154(b) by 323 days.

(21) Appl. No.: 13/644,313

(22) Filed: Oct. 4, 2012

(65) Prior Publication Data

US 2013/0096806 A1 Apr. 18, 2013

(30) Foreign Application Priority Data

Oct. 12, 2011 (FR) ...................................... 11 03114

(51) Int. Cl.
*F02B 47/08* (2006.01)
*F02D 41/00* (2006.01)
(Continued)

(52) U.S. Cl.
CPC .......... *F02D 41/005* (2013.01); *F02D 41/1448* (2013.01); *F02B 29/04* (2013.01);
(Continued)

(58) Field of Classification Search
CPC .............. F02D 41/005; F02D 41/0072; F02D 41/0077; F02D 41/1448; F02M 25/0726; F02M 25/0709; F02B 29/04

USPC ................ 701/103, 108; 123/568.19, 568.21, 123/568.12, 559.1; 73/114.69, 114.74; 60/605.2

See application file for complete search history.

(56) References Cited

U.S. PATENT DOCUMENTS 6,170,469 B1 1/2001 Itoyama et al.
6,877,369 B2 * 4/2005 Matsunaga et al. ........ 73/114.74
(Continued)

FOREIGN PATENT DOCUMENTS

DE 10 2007 010 501 A1 9/2008
EP 0 485 089 A2 5/1992
(Continued)

OTHER PUBLICATIONS

Heywood, John B.: Internal Combustion Engine Fundamentals, passage, Jan. 1, 1988, Internal Combustion Engine Fundamentals; [McGraw-Hill Series in Mechanical Engineering], New York, McGraw-Hill, US, pp. 308-321, XP008135606.

*Primary Examiner* — Hai Huynh
(74) *Attorney, Agent, or Firm* — Fitch Even Tabin & Flannery

(57) ABSTRACT

The invention relates to a method of controlling a combustion engine (1) comprising at least one cylinder (2) and a manifold (3) and an exhaust gas recirculation (EGR) circuit including an EGR valve. The EGR valve (6) is controlled by carrying out the following stages: a) measuring a pressure difference $\Delta P$ in a portion of the exhaust gas recirculation circuit including the EGR valve; b) selecting a burnt gas fraction set point $BGR^{sp}$ in the intake manifold (3); c) calculating an opening set point for the EGR valve (6) from a pressure drop relation applied in a portion of the exhaust gas recirculation circuit including the EGR valve, depending on difference $\Delta P$ at the EGR valve and on the burnt gas fraction set point $BGR^{sp}$ in the intake manifold; and d) controlling the EGR valve (6) as a function of the opening set point of EGR valve (6).

11 Claims, 2 Drawing Sheets

(51) Int. Cl.
*F02D 41/14* (2006.01)
*F02M 25/07* (2006.01)
*F02B 29/04* (2006.01)

(52) U.S. Cl.
CPC .... *F02D 41/0072* (2013.01); *F02D 2200/0402* (2013.01); *F02D 2200/0406* (2013.01); *F02M 25/0709* (2013.01); *F02M 25/0726* (2013.01); *Y02T 10/47* (2013.01)

(56) References Cited

U.S. PATENT DOCUMENTS

| | | | |
|---|---|---|---|
| 8,887,701 B2* | 11/2014 | Nam | 123/568.11 |
| 2004/0089061 A1 | 5/2004 | Matsunaga et al. | |
| 2010/0199639 A1* | 8/2010 | Matsunaga et al. | 60/278 |
| 2012/0117011 A1* | 5/2012 | Hashimoto et al. | 706/23 |
| 2012/0304640 A1* | 12/2012 | Tsuyuki | 60/605.2 |
| 2013/0139795 A1* | 6/2013 | Saitoh et al. | 123/568.16 |
| 2014/0020665 A1* | 1/2014 | Yoshioka | 123/568.24 |
| 2015/0033735 A1* | 2/2015 | Makki et al. | 60/605.2 |

FOREIGN PATENT DOCUMENTS

| | | |
|---|---|---|
| EP | 1 416 138 A2 | 5/2004 |
| EP | 1 416 138 A3 | 5/2004 |
| EP | 2 098 710 A1 | 9/2009 |
| FR | 2 833 998 A1 | 6/2003 |
| FR | 2 910 929 A1 | 7/2008 |
| FR | 2 947 007 A1 | 12/2010 |
| WO | WO 2004/055344 A1 | 7/2004 |
| WO | WO 2008/107247 A1 | 9/2008 |

\* cited by examiner

METHOD OF CONTROLLING AN EGR VALVE INTEGRATED IN AN EGR CIRCUIT OF A COMBUSTION ENGINE

CROSS REFERENCE TO RELATED APPLICATION

Reference is made to French Patent Application No. 11/03.114, filed on Oct. 12, 2011, which application is incorporated herein by reference in its entirety.

BACKGROUND OF THE INVENTION

1. Field of the Invention

The present invention relates to engine control and more particularly to the control of the burnt gas recirculation rate for a gasoline engine provided with an exhaust gas recirculation circuit (EGR circuit).

2. Description of the Prior Art

Downsizing gasoline engines currently appears to be the preferred option for reducing the consumption of fuel. In fact, this technology allows shifting the working points of the engine to zones of higher efficiency and thus to limit the pumping losses inherent in the operation of an internal-combustion engine. This type of engine then requires the presence of a compressor driven by a turbine arranged in the exhaust line. Such a device is used to improve air filling of the cylinder and to provide a torque equivalent to that of an engine of conventional displacement. It is thus possible to have the same performances of a conventional displacement engine while drastically reducing the consumption.

However, using such a technology greatly increases the risk of engine knocking. When the engine runs under full load conditions, the thermodynamic conditions in the combustion chamber may be detrimental to the stability of the mixture and generate auto-ignition thereof. This phenomenon can eventually greatly deteriorate the combustion chamber.

To solve this problem, the ignition advance is usually degraded. This option generates an increase in the gas temperature at the end of the combustion cycle and therefore over the entire exhaust line. Thus, in order to compensate for this phenomenon, the mixture is richened at the intake.

Such a method involves two drawbacks: which are increasing the engine consumption and furthermore, it deteriorates the efficiency of the catalyst arranged downstream from the exhaust manifold, which provides optimal conversion of the pollutants resulting from the combustion when the mixture is in stoichiometric proportions.

In this context, exhaust gas recirculation (EGR) from the exhaust to the intake is a promising option. Indeed, feeding burnt gas that has not reacted during combustion into a cylinder of the engine allows decreasing the overall combustion temperature and to limit engine knocking. The advantages of downsizing in terms of efficiency and consumption are thus preserved. Besides, introduction of burnt gas also allows reduction of the temperature of the exhaust gas and therefore limiting the impact thereof on the catalyst or the turbine.

However, such a strategy has a great influence on the overall running conditions of the engine. For example, the air mass trapped in the cylinder is smaller in an EGR configuration since burnt gas takes the place of fresh air in the cylinder. To operate under stoichiometric conditions, it is necessary to adjust the fuel loop to the air loop, and thus to control very precisely the amount of burnt gas in the cylinder. Besides, a high-performance control method is essential for torque transient management, notably at low loads where too high a proportion of burnt gas can extinguish the combustion.

To control the amount of burnt gas, current systems (described for example in patent applications FR-2,947,007 A1, EP-2,098,710 A1 and EP-0,485,089 A2) use an air flow detector, which has the drawback of being imprecise. The imprecisions of this detector do not allow optimum control of the composition of the gas in the intake manifold and thus operation under stoichiometric conditions, which generates imprecisions regarding engine control and influences the overall running conditions of the engine.

Control of the mixture composition at the intake is an essential component of the combustion control of supercharged gasoline engines.

SUMMARY OF THE INVENTION

The goal of the present invention is to provide an alternative method allowing control in real time of the composition of the gas at the intake for an engine equipped with a pressure difference detector. This pressure difference detector affords the advantage of increasing the precision of the measured values and therefore also of increasing the engine control precision. Using such a detector requires applying a punctual pressure drop relation. Thus, an EGR valve is controlled to observe a burnt gas function set point.

The method according to the invention relates to a method of controlling a combustion engine comprising at least one cylinder and an intake manifold, the engine being equipped with a exhaust gas recirculation circuit integrating an EGR valve.

According to the invention, the control method comprises the following stages:
   a) measuring a pressure difference $\Delta P$ at the EGR valve;
   b) selecting a burnt gas fraction set point $BGR^{sp}$ in the intake manifold;
   c) calculating an opening set point $O^{sp}$ for the EGR valve from a pressure drop relation in a portion of the exhaust gas recirculation circuit including the EGR valve (such as the Barré-Saint Venant relation) in which the pressure drop relates the opening of the EGR valve to pressure difference $\Delta P$ in the portion of the exhaust gas recirculation circuit including the EGR valve and to the burnt gas fraction set point $BGR^{sp}$ in the intake manifold; and
   d) controlling the EGR valve as a function of the opening set point of the EGR valve.

In one embodiment, the pressure drop relation is adapted to the engine by an air loop model, which is a dynamic model of the air intake circuit and of the EGR burnt gas recirculation circuit. In this case, the model of the air loop can be a model of the burnt gas dynamics and of a static cylinder filling model integrated in a dynamic model of the intake manifold.

Advantageously, the air loop model can be constructed by carrying out the following stages:
   i) using a static cylinder filling model to calculate a cylinder filling mass flow rate $D_{asp}$ from the engine parameters;
   ii) applying a dynamic model of the intake manifold to calculate a mass flow rate $D_{thr}$ downstream from the compressor, from cylinder filling mass flow rate $D_{asp}$ and the engine parameters;
   iii) applying a dynamic gas transport model to determine a burnt gas fraction set point $BGR_{bp}^{sp}$ in the volume downstream from the EGR valve, from burnt gas fraction set point $BGR^{sp}$ in the intake manifold; and
   iv) applying a dynamic fresh gas and burnt gas mixing model to determine a mass flow rate set point for the burnt gas fed through the EGR valve, $D_{gb}^{sp}$, from mass flow rate $D_{thr}$ downstream from the compressor, from the engine parameters and from burnt gas fraction set point $BGR_{bp}^{sp}$ in the volume downstream from the EGR valve, the punctual pressure drop relation being a function of the set point.

Preferably, a pressure drop relation is used which defines an effective surface area set point $S^{sp}(\Delta P)$ for the valve as a function of pressure difference $\Delta P$ in a portion of the exhaust gas recirculation circuit including the EGR valve and of the burnt gas fraction set point $BGR^{sp}$ in the intake manifold, then the effective valve surface area set point $S^{sp}(\Delta P)$ is expressed as an opening set point $O^{sp}$ of the EGR valve from a map of the valve.

In an embodiment, the fresh gas and burnt gas mixing dynamics model is defined by the formula as follows:

$$\frac{d}{dt}BGR_{bp} = \frac{rT_{atm}}{P_{atm}V_{bp}}(-[D_{gb}(t) + D_{air}(t)]BGR_{bp} + D_{gb}(t))$$

with $BGR_{bp}$ being the burnt gas fraction in the volume downstream from the EGR valve;

r is the ideal gas constant;

$T_{atm}$ is the atmospheric temperature;

$P_{atm}$ is the atmospheric pressure;

$V_{bp}$ is the fresh air and burnt gas mixing volume;

$D_{gb}$ is the mass flow rate of burnt gas fed through the EGR valve; and $D_{air}$ is the mass flow rate of fresh air at the intake line inlet.

Moreover, the gas transport dynamics model can represent a spatial distance between the EGR valve and the intake manifold of the engine, and it corresponds to a pure delay.

Furthermore, the pressure drop relation can be based on a Barré-Saint Venant relation, linearized for the small pressure difference values $\Delta P$ in the portion of the exhaust gas recirculation including the EGR valve, which satisfy the inequality $\Delta P < 10\% P_{atm}$.

Advantageously, the pressure difference at the EGR valve is measured by at least one pressure detector upstream and/or downstream from the EGR valve.

Preferably, selection of the burnt gas fraction set point $BGR^{sp}$ in the intake manifold is determined by an engine map resulting from a static calibration.

Furthermore, the invention relates to a combustion engine comprising at least one cylinder and an intake manifold, the combustion engine being provided with a exhaust gas recirculation circuit comprising an EGR valve equipped with a pressure difference detector in a portion of the exhaust gas recirculation circuit including the EGR valve, the engine comprising control means for controlling the engine, the control means applying the control method according to the invention.

BRIEF DESCRIPTION OF THE FIGURES

Other features and advantages of the method according to the invention will be clear from reading the description hereafter of non limitative embodiment examples, with reference to the accompanying figures wherein.

DETAILED DESCRIPTION OF THE INVENTION

Figure 1:
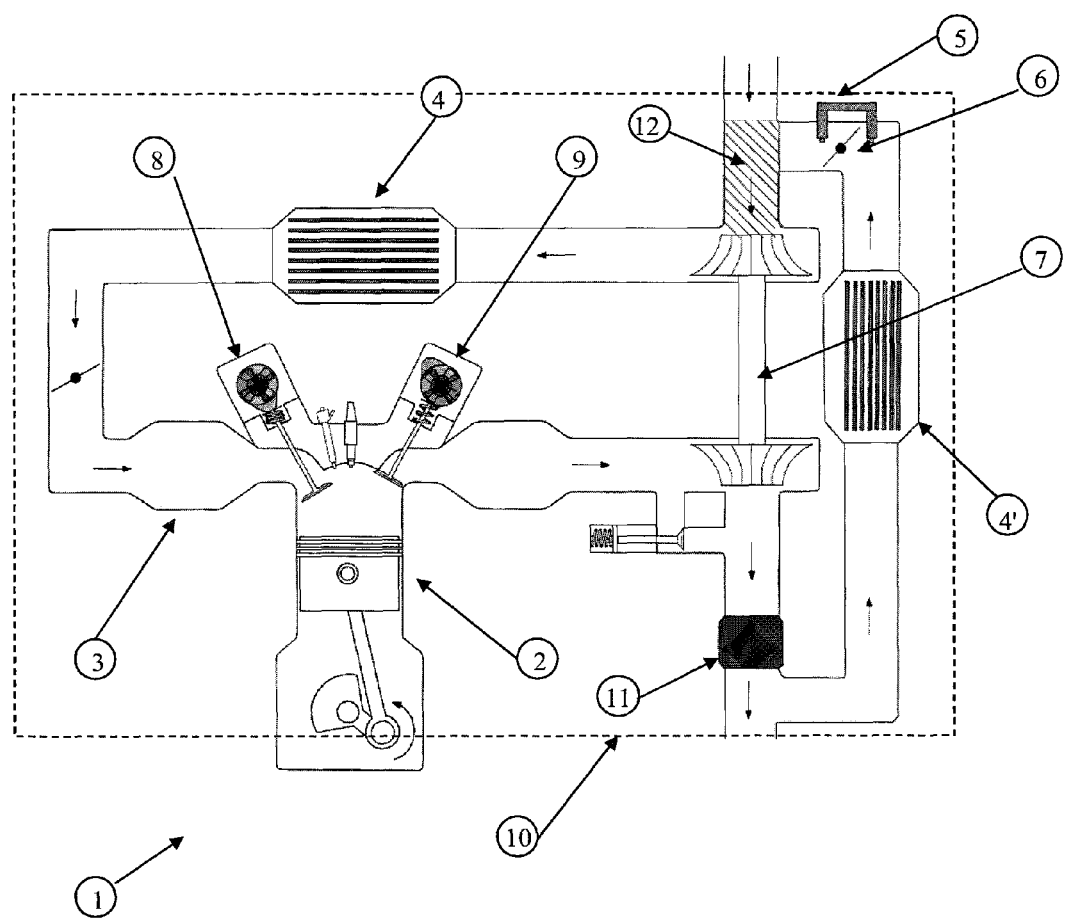
FIG. 1 illustrates a supercharged gasoline engine comprising a low-pressure EGR circuit (EGR-BP)

FIG. 1 shows a gasoline engine (1) provided with an EGR exhaust gas recirculation circuit. For this embodiment, it is a low-pressure EGR circuit. At least one cylinder (2) of combustion engine (1) is supplied with air and burnt gas from an intake manifold (3). The air intake circuit is provided with a cooler (4) and a turbocharger (7) compressor. The exhaust line includes an exhaust manifold, a turbocharger (7) turbine and a bypass line, for injecting part of the burnt gas into the air intake circuit. This part of the circuit is notably provided with a cooler (4') and a controlled valve, referred to as EGR valve (6), which controls the amount of burnt gas injected into the air intake circuit. This engine is in particular equipped with a pressure difference detector (5) located in a portion of the exhaust gas recirculation circuit between upstream and downstream of the EGR valve. Engine (1), as shown in FIG. 1, is also provided with a direct injection device and a variable valve timing system. These elements are usually present in a downsized engine (reduced engine displacement), but whose presence is not taken into consideration in the method according to the invention.

The exhaust gas recirculation circuit withdraws burnt gas at the engine exhaust, at the outlet of catalyst (11), downstream from the turbine of turbocharger (7), and reinjects it into the intake of a cylinder (2) upstream from the compressor of turbocharger (7). The amount of burnt gas reinjected into the intake line is controlled by controlled EGR valve (6) arranged downstream from the EGR burnt gas recirculation circuit.

Since a gasoline engine runs under optimum conditions when the proportion of air/gasoline mixture allows providing complete combustion of the fuel without excess air, it is generally considered that the exhaust gas fully is burnt gas. Thus, the EGR burnt gas recirculation circuit is filled with burnt gas only.

The method according to the invention allows precisely controlling the EGR valve (6) of an exhaust gas recirculation circuit. It is based on the use of a pressure difference detector at the EGR valve and on the application of a pressure drop relation at the level of the EGR valve.

The method according to the invention comprises the following stages:

a) measuring a pressure difference $\Delta P$ at the level of the EGR valve;

b) selecting a burnt gas fraction set point $BGR^{sp}$ in the intake manifold (3);

c) calculating an opening set point $O^{sp}$ for the EGR valve (6) from a pressure drop relation applied at the EGR valve (such as the Barré-Saint Venant relation), the pressure drop relation relating the opening of the EGR valve to pressure difference $\Delta P$ in a portion of the exhaust gas recirculation circuit including the EGR valve, and to the burnt gas fraction set point $BGR^{sp}$ in the intake manifold; and d) controlling the EGR valve (6) as a function of the opening set point of EGR valve (6).

Notations

In the description, the terms upstream and downstream are defined with respect to the direction of flow of the fluids in air loop (10). Furthermore, the following notations are used:

Engine Parameters $P_{adm}$ and $T_{adm}$ are the pressure and the temperature in the intake manifold. Conventionally, the intake temperature is considered to be constant. Indeed, the exchanger arranged upstream from the manifold is so dimensioned as to provide such a regulation.

$P_{atm}$ and $T_{atm}$ are the atmospheric pressure and the temperature. They can be considered to be constant.

$T_{am}$ is an upstream temperature at the EGR valve inlet. This temperature is caused by the temperature of the passage through exchanger (4') arranged in the burnt gas recirculation circuit.

$V_{bp}$ is the fresh air and burnt gas mixing space, downstream from the EGR valve. It is the volume occupied by the lines at the intersection of the fresh air delivery lines and the burnt gas delivery lines. This space extends up to the compressor of turbocharger (7). This space corresponds to the hatched zone (12) of FIG. 1. In an embodiment of the exhaust gas recirculation circuit, a manifold can be integrated between the EGR valve and the compressor. In this case $V_{bp}$ represents the volume of the manifold.

$\Phi_{adm}$ and $\Phi_{ech}$ are the position of the intake (8) and exhaust (9) valve actuators. These variables quantify a phase difference with respect to a reference position.

$N_e$ is engine speed.

Variables of the Air Loop Model

BGR is the burnt gas mass fraction in the intake manifold. It conditions the mass of burnt gas present in the cylinder upon closure of the intake valve.

$BGR_{bp}$ is the burnt gas mass fraction in the volume downstream from the EGR valve.

$D_{thr}$ is the mass flow rate passing through air cooler (4).

$D_{gb}$ is the mass flow rate of burnt gas fed through EGR valve (6).

$D_{air}$ is the fresh air mass flow rate at the intake line inlet.

$D_{asp}$ is the mass flow rate of cylinder filling.

S is the effective surface area of the EGR valve. This quantity characterizes the amount of fluid that can flow through the valve and it is linked with the opening of the valve via a characteristic map of the valve considered.

τ is the gas transport delay between the time of fresh air and burnt gas mixing, and the delivery in the intake manifold.

$P_{am}$ is the upstream pressure at the EGR valve inlet.

$P_{av}$ is the downstream pressure at the EGR valve outlet.

ΔP is the pressure difference between upstream and downstream from the EGR valve: $\Delta P = P_{am} - P_{av}$. This quantity can be measured with the instrumentation of the EGR valve.

O is the valve opening. This quantity characterizes the valve opening ratio.

Constants of the Air Loop Model r is the specific ideal gas constant, which is the same for all the gases concerned here (exhaust gas and air), and has the value 288 J/kg/K.

γ is gas specific heat ratio. The gases are assumed to be ideal and this ratio is an identical constant for all the gases concerned with the value 1.4.

These notations, with index —$^{sp}$, represent the set points associated with the quantities considered.

Stage a)—Measurement of a Pressure Difference at the Level of the EGR Valve

In order to control EGR valve (6) in a precise manner, according to the invention, an EGR valve control method is used depending on pressure difference ΔP in a portion of the exhaust gas recirculation circuit including the EGR valve (6).

In an embodiment, this value can be known using a pressure difference detector (5) at the EGR valve (6). Alternatively, two distinct detectors can be used, measuring respectively the pressure at the valve inlet $P_{av}$ and the pressure at the valve outlet $P_{am}$. It is also possible to arrange pressure detectors at other points of air loop (10) and to deduce the value of ΔP from the measured values.

Stage b)—Selection of a Burnt Gas Fraction Set Point in the Manifold

For optimum engine control, a burnt gas fraction set point is selected in the intake manifold $BGR^{sp}$. To select this set point $BGR^{sp}$, an engine map resulting from a static calibration or a burnt gas control strategy in a combustion engine can be used. In order to save time during the progress of the method, this stage is preferably conducted simultaneously with the stage of measuring the pressure difference at the EGR valve (6).

Stage c) Calculation of the EGR Valve Opening Set Point

To calculate the EGR valve opening set point, a relation of a pressure drop in a portion of the exhaust gas recirculation circuit including the EGR valve is used. This relation allows determination of the valve opening set point $O^{sp}$ as a function of pressure difference ΔP at the level of EGR valve (6) and of burnt gas fraction set point in the intake manifold $BGR^{sp}$. Preferably, the pressure drop relation is based on a Barré-Saint Venant relation applied to a portion of the exhaust gas recirculation circuit including the EGR valve, and this relation can be linearized for the small values of ΔP (for example for $\Delta P < 10\% P_{atm}$).

Figure 3:
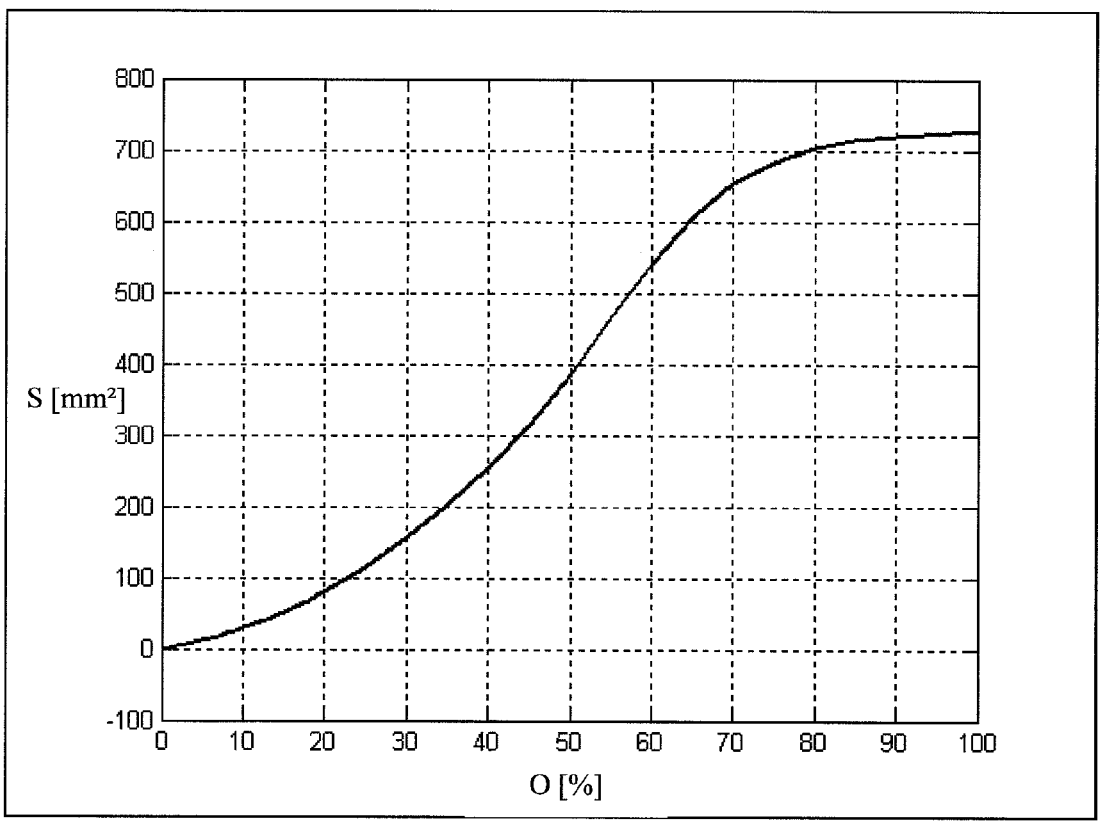
FIG. 3 illustrates a map of an EGR valve showing the connection between the effective surface area and the opening of the valve.

In an embodiment, a pressure drop relation is used depending on pressure difference ΔP at the valve in order to determine an effective surface area set point $S^{sp}(\Delta P)$ for the valve from burnt gas fraction set point $BGR^{sp}$ in the intake manifold. The effective surface area set point $S^{sp}(\Delta P)$ of the valve is then expressed as a valve opening set point $O^{sp}$ from a valve map. An example of such a valve map is illustrated in FIG. 3.

Advantageously, the pressure drop relation is adapted to the engine by means of a model of air loop (10), which is a dynamic model of the air intake circuit and of the EGR burnt gas recirculation circuit. Air loop (10) is made up of the intake circuit and of the gas recirculation circuit as a whole. The input data of the air loop model are the engine parameters, burnt gas fraction set point $BGR^{sp}$, pressure difference ΔP at the EGR valve. In order to control the real behavior of the engine and to create an air loop model as representative as possible, it is important to know some parameters of the engine, that is data characterizing it, and data relative to the operation thereof. These parameters can be measured, simulated and/or obtained from manufacturer's data. The measured or simulated parameters can be the pressure in the intake manifold $P_{adm}$, the temperature in the intake manifold $T_{adm}$, the atmospheric pressure $P_{atm}$, the atmospheric temperature $T_{atm}$, the temperature at the EGR valve outlet $T_{am}$, positions $\phi_{adm}$ and $\phi_{ech}$ of the intake and exhaust valve actuators, and engine speed $N_e$.

In an embodiment, atmospheric pressure $P_{atm}$ and atmospheric temperature $T_{atm}$ can be considered to be constants to simplify the model. Moreover, intake temperature $T_{adm}$ is considered to be constant. Indeed, exchanger (4) arranged upstream from the manifold is so dimensioned as to provide such regulation.

This air loop model can be a model of the burnt gas dynamics and of a static cylinder filling model coupled with a dynamic model of the intake manifold.

In an advantageous embodiment, the air loop model is constructed by carrying out the following stages:
i) applying a static cylinder filling model to calculate a cylinder filling mass flow rate $D_{asp}$ from engine parameters;
ii) applying a dynamic model of the intake manifold to calculate a mass flow rate $D_{thr}$ downstream from the compressor, from cylinder filling mass flow rate $D_{asp}$ and engine parameters;
iii) applying a dynamic gas transport model to determine a burnt gas fraction set point $BGR_{bp}^{sp}$ in the volume downstream from the EGR valve, from burnt gas fraction set point $BGR^{sp}$ in the intake manifold; and
iv) using a dynamic fresh gas and burnt gas mixing model to determine a mass flow rate set point for the burnt gas fed through the EGR valve, $D_{gb}^{sp}$, from mass flow rate $D_{thr}$ downstream from the compressor, from engine parameters and from burnt gas fraction set point $BGR_{bp}^{sp}$ in the volume downstream from the EGR valve.

Figure 2:
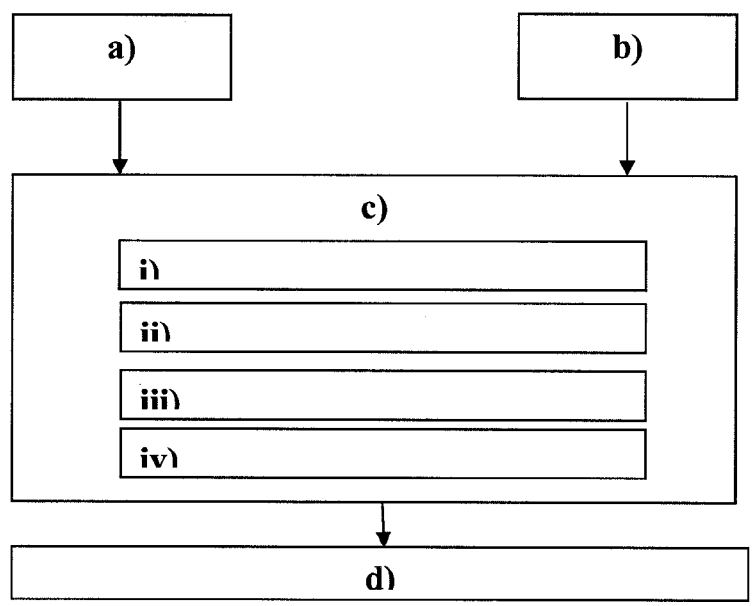
FIG. 2 shows a flowchart of the method according to the invention.

This embodiment of the method is described in its entirety by the flowchart of FIG. 2. Stages a) to d) are represented by chronologically ordered blocks, and stages i) to iv) by blocks integrated in stage c).

After constructing the air loop model, a pressure drop relationship in a portion of the exhaust gas recirculation circuit including the EGR valve is applied. The pressure drop relation is a function of the mass flow rate set point for the burnt gas fed through the EGR valve, $D_{gb}^{sp}$.

Stage i)—Static Cylinder Filling Model

This model allows calculation of the cylinder filling mass flow rate. An example of such a model has been developed at IFP Energies nouvelles, France, by T. LEROY and J. CHAUVIN, and disclosed in French patent application 2,941,266 A1 corresponding to U.S. Published Application 2010/0180876 A.

The total flow rate passing through the intercooler is estimated. Such an estimation is performed by a static cylinder filling model coupled with a dynamic intake manifold model.

A static filling model estimating the burnt gas mass in the cylinder as a function of the engine speed, the intake temperature and pressure, and the positions of the actuators are considered.

$$\begin{cases} M_{asp}^{int} = \alpha_1 \dfrac{P_{adm}}{rT_{adü}} V_{ivc} - M_{asp}^{ech} \\ M_{asp}^{ech} = \alpha_2 \dfrac{OF}{N_e} + \alpha_3 V_{evc} \end{cases} \quad \text{Equation (1)}$$

with:

$M_{asp}^{int}$ is the burnt gas mass in the cylinder.
$M_{asp}^{ech}$ is the burnt gas mass at the cylinder exhaust.
$\alpha_1, \alpha_2, \alpha_3$ are known maps, functions of $P_{adm}$ and $N_e$ (experimentally determined on the test bench).
$V_{ivc}$ is the volume of the cylinder upon ivc (intake valve closure), a function of the position of the intake valve actuator $\Phi_{adm}$, and of the engine dimensions.
$V_{evc}$ is the volume of the cylinder upon evc (exhaust valve closure), a function of the position of the exhaust valve actuator $\Phi_{ech}$, and of the engine dimensions.

OF is the overlap factor. It is a function of the positions of the intake and exhaust valve actuators $\Phi_{adm}$ and $\Phi_{ech}$.

From this system of equations, the mass of burnt gas in the cylinder depending on engine parameters $P_{adm}$, $N_e$, $\Phi_{adm}$ and $\Phi_{ech}$, and on overlap factor OF can be expressed.

The overlap factor OF is determined by the relation:

$$OF = \int_{\theta_{ivo}}^{\theta_{iv}=\theta_{ev}} A_{int} d\theta + \int_{\theta_{iv}=\theta_{ev}}^{\theta_{evc}} A_{ech} d\theta$$

with:

$A_{adm}$ and $A_{ech}$ are the intake and exhaust valve opening areas which are engine parameters.

$\theta$ is the crank angle.

$\theta_{ivo}$ is the crank angle upon ivo (intake valve opening) which is a function of the position of the intake valve actuator $\Phi_{adm}$.

$\theta_{evc}$ is the crank angle upon evc (exhaust valve closure) which is a function of the position of the exhaust valve actuator $\Phi_{ech}$.

$\theta_{iv} = \theta_{ev}$ is the crank angle where both valves have the same opening area.

By combining the equations of system (1), a function g between the burnt gas mass as a function of the three parameters $P_{adm}$, $\Phi_{adm}$ and $\Phi_{ech}$ can be defined.

$$M_{asp}^{int} = \qquad \qquad \text{Equation (2)}$$

$$g(P_{adm}, \Phi_{adm}, \Phi_{ech}) = \alpha_1(P_{adm}, N_e) \dfrac{P_{adm}}{rT_{adm}} V_{ivc}(\Phi_{adm}) -$$

$$\alpha_2(P_{adm}, N_e) \dfrac{OF(\Phi_{adü}, \Phi_{ech})}{N_e} - \alpha_3(P_{adm}, N_e) V_{ech}(\Phi_{ech})$$

The mass flow rate of cylinder filling with air can be determined by the relation (3):

$$D_{asp} = \dfrac{Ne}{30} M_{asp}^{int}$$

The Equations (2) and (3) are combined and, for the sake of clarity, the engine speed and the intake temperature are disregarded in the expression. Thus, a function f between the cylinder filling mass flow rate and the three parameters $P_{adm}$, $\Phi_{adm}$ and $\Phi_{ech}$ is defined.

$$\begin{aligned} D_{asp} &= \dfrac{N_e}{30} M_{asp}^{int} \qquad &\text{(Equation (4))} \\ &= \dfrac{N_e}{30} g(P_{adm}, \Phi_{adm}, \Phi_{ech}) \\ &= f(P_{adm}, \Phi_{adm}, \Phi_{ech}) \end{aligned}$$

Stage ii)—Dynamic Intake Manifold Model

By modelling the flows passing through the intake manifold, the mass flow rate downstream from the butterfly, $D_{thr}$ can be calculated, from cylinder filling mass flow rate $D_{asp}$ and some engine parameters. For example, the equation is expressed as follows:

$$D_{thr} = D_{asp} + \dfrac{r}{V_{adm} T_{adm}} \dfrac{dP_{adm}}{dt}$$

where $V_{adm}$ is the volume of the intake manifold.

A function h between the mass flow rate downstream from the butterfly, $D_{thr}$, and the variables $D_{asp}$ and $$\frac{dP_{adm}}{dt}$$

can be determined.

$$D_{thr} = h\left(D_{asp}, \frac{dP_{adm}}{dt}\right) \quad \text{(Equation (5))}$$

Thus, by combining Equations (4) and (5), a function H between the mass flow rate downstream from the butterfly, $D_{thr}$, and variables $P_{adm}$, $\Phi_{adm}$, $\Phi_{ech}$ and $$\frac{dP_{adm}}{dt}$$

can be expressed.

$$\begin{aligned} D_{thr} &= h\left(D_{asp}, \frac{dP_{adm}}{dt}\right) \\ &= h\left(f(P_{adm}, \phi_{adm}, \phi_{ech}), \frac{dP_{adm}}{dt}\right) \\ &= H\left(P_{adm}, \phi_{adm}, \phi_{ech}, \frac{dP_{adm}}{dt}\right) \end{aligned} \quad \text{(Equation (6))}$$

Stage iii)—Dynamic Gas Transport Model

This stage of the method determines the burnt gas fraction set point in the intake manifold. A transport dynamics represents the spatial distance between the actuator and the intake manifold, and corresponds to a pure delay τ variable over time. Modelling of this delay can therefore be written as follows:

$BGR(t)=BGR_{bp}(t-\tau(t))$

By applying this relation to the set points, equality (7) becomes:

$BGR^{sp}(t)=BGR_{bp}^{sp}(t-\tau(t))$

Thus, to control the burnt gas composition in the intake manifold, direct control of the composition in the volume downstream from the EGR valve is accomplished. This stage can be carried out simultaneously with stages i) and ii) to save computation time, or it can be carried out before these stages.

Stage iv)—Dynamic Gas Mixing Model

To determine the mass flow rate set point for the burnt gas fed through the EGR valve, $D_{gb}^{sp}$, which are the fresh gas and burnt gas dynamics, has to be modelled.

Therefore, the modelling is used as follows (8):

$$\frac{d}{dt}BGR_{bp}(t) = \frac{rT_{am}}{P_{atm}V_{bp}}(-[D_{gb}(t) + D_{air}(t)]BGR_{bp} + D_{gb}(t))$$

Under steady conditions, Equation (9) is obtained for the flow rates:

$D_{thr}=D_{gb}+D_{air}$

Thus, by combining Equations (6) to (9), a relation (10) between the mass flow rate set point for the burnt gas fed through the EGR valve and different variables is expressed:

$$D_{gb}^{sp} = \frac{P_{atm}V_{bp}}{rT_{am}}\frac{d}{dt}BGR^{sp} + H\left(P_{adm}, \phi_{adm}, \phi_{ech}, \frac{dP_{adm}}{dt}\right)BGR^{sp}$$

Then, by applying a pressure drop relation in a portion of the exhaust gas recirculation circuit including the EGR valve (for example, the Barré-Saint Venant relation), a relation between the mass flow rate of burnt gas fed through the EGR valve, $D_{gb}$, the effective surface area S of the EGR valve, the temperature upstream from the valve, $T_{am}$, and the pressure difference at the valve is expressed.

$$D_{gb} = \frac{SP_{am}}{\sqrt{rT_{am}}}\begin{cases} \left(\frac{P_{av}}{P_{am}}\right)^{\frac{1}{\gamma}}\sqrt{\frac{2\gamma}{\gamma-1}\left(1-\left(\frac{P_{av}}{P_{am}}\right)^{\frac{\gamma-1}{\gamma}}\right)} & \text{if } \frac{P_{av}}{P_{am}} > \left(\frac{2}{\gamma+1}\right)^{\frac{\gamma}{\gamma-1}} \\ \sqrt{\gamma\left(\frac{2}{\gamma+1}\right)^{\frac{\gamma+1}{\gamma-1}}} & \text{otherwise} \end{cases} \quad \text{(Equation (11))}$$

This relation is obtained by applying the Barré-Saint Venant relation for a fluid flowing from a point 1 (upstream) to a point x (downstream), which allows determination of the velocity V of the fluid at point x:

$$V(x) = \sqrt{\frac{2\gamma}{\gamma-1}rT_1\left(1 - \left(\frac{P(x)}{P_1}\right)^{\frac{\gamma}{\gamma-1}}\right)}$$

Then, the velocity is related to the mass flow rate by the relation:

$$V(x) = \frac{D_{gb}}{\rho S}$$

The formula as follows is then applied to obtain Equation (11):

$$\rho = \frac{P_1}{rT}$$

To simplify this model, the pressure downstream from the valve is considered to be the atmospheric pressure and the relation below can therefore be expressed only by means of quantity $\Delta P = P_{am} - P_{av}$ and $P_{atm}$. In an advantageous embodiment of the invention, this model can be linearized for the small values of $\Delta P$ (for example for $\Delta P < 10\% P_{atm}$). This relation is then reversed to determine a function j between the effective surface area S of the valve and the mass flow rate of burnt gas fed through the EGR valve, $D_{gb}$, the temperature upstream from the valve, $T_{am}$, and the pressure difference (P at the level of the valve. By writing this relation in terms of set point, the following equality equation is utilized $$S^{sp} = j(D_{gb}^{sp}, T_{am}, \Delta P) \qquad (12)$$
$$= j\left(\frac{P_{atm}V_{bp}}{rT_{am}}\frac{d}{dt}BGR^{sp} + H\left(P_{adm}, \phi_{adm}, \phi_{ech}, \frac{dP_{adm}}{dt}\right)BGR^{sp}, T_{am}, \Delta P\right)$$

The effective surface area set point for the EGR valve can therefore be written only as a function of known engine parameters, of the burnt gas fraction set point selected in the intake manifold and of variable $\Delta P$.

Finally, valve opening O is related to effective surface area S by a map characteristic of the valve (FIG. 3). This map of the EGR valve can be known from manufacturer's data or it can be determined experimentally. The valve opening set point can thus be determined from the effective surface area set point thereof.

Stage d)—EGR Valve Control

Valve opening set point $O^{sp}$ is then applied to the valve. Manual, hydraulic, pneumatic, electric, electronic or mechanical controls can be selected for the valve.

The control method according to the invention thus allows:
controlling the composition of the gas in the intake manifold of a gasoline engine equipped with an EGR system and a pressure difference detector between upstream and downstream of the EGR valve;
improving the burnt gas fraction transient response, to provide better driveability;
using the EGR device over a wider operating range to increase the performance of the vehicle; and
reducing exhaust gas emissions without having to increase the engine consumption.

Furthermore, the invention also relates to a combustion engine comprising at least one cylinder and an intake manifold, the combustion engine being provided with a exhaust gas recirculation circuit comprising an EGR valve equipped with a pressure difference detector in a portion of the exhaust gas recirculation circuit including the EGR valve with the EGR valve being controlled, electronically for example, by a method as defined above.

The invention claimed is:

1. A method of controlling a combustion engine including at least one cylinder, an intake manifold, a compressor for compressing intake air and a cooler for cooling compressed intake air and an exhaust gas recirculation circuit including an EGR valve which injects exhaust gas into the intake manifold upstream from the compressor and the cooler comprising:

a) measuring a pressure difference in a portion of the exhaust gas recirculation circuit including the EGR valve which is upstream from the compressor and the cooler;
b) selecting a burnt gas fraction set point in the intake manifold;
c) calculating an opening set point for the EGR valve from a pressure drop relation in the portion of the exhaust gas recirculation circuit including the EGR valve, the pressure drop relation relating an opening of the EGR valve to the pressure difference in the portion of the exhaust gas recirculation circuit including the EGR valve, and to the burnt gas fraction set point in the intake manifold; and
d) controlling the EGR valve as a function of the opening set point of EGR valve.

2. A method as claimed in claim 1, wherein the pressure drop relation is related to the engine by a model of an air loop, which is a dynamic model of the air intake circuit and of the EGR exhaust gas recirculation circuit.

3. A method as claimed in claim 2, wherein the model of an air loop includes to model of the burnt gas dynamics and a model of a static cylinder filling integrated in a dynamic model of the intake manifold.

4. A method as claimed in claim 3, wherein the fresh gas and burnt gas mixing dynamics model is defined by the formula as follows:

$$\frac{d}{dt}BGR_{bp} = \frac{rT_{atm}}{P_{atm}V_{bp}}(-[D_{gb}(t) + D_{air}(t)]BGR_{bp} + D_{gb}(t))$$

with $BGR_{bp}$ being burnt gas fraction in the volume downstream from the EGR valve,
r is the ideal gas constant;
$T_{atm}$ is the atmospheric temperature;
$P_{atm}$ is the atmospheric pressure;
$V_{bp}$ is the fresh air and burnt gas mixing volume;
$D_{gb}$ is the mass flow rate of burnt gas fed through the EGR valve; and
$D_{air}$ is the mass flow rate of fresh air at the intake line inlet.

5. A method as claimed in claim 3, wherein:
the gas transport dynamics model represents a spatial distance between the EGR valve and the intake manifold of the engine corresponding to a pure delay.

6. A method as claimed in claim 2, wherein the air loop model is constructed by:
i) applying a static cylinder filling model to calculate a cylinder filling mass flow rate from engine parameters;
ii) applying a dynamic model of the intake manifold to calculate a mass flow rate downstream from the compressor, from the cylinder filling mass flow rate and engine parameters;
iii) applying a dynamic gas transport model to determine a burnt gas fraction set point in a volume downstream from the EGR valve, from a burnt gas fraction set point in the intake manifold; and iv) applying a dynamic fresh gas and burnt gas mixing model to determine a mass flow rate set point for the burnt gas fed through the EGR valve, from mass flow rate downstream from the compressor, from the engine parameters and from the burnt gas fraction set point in a volume downstream from the EGR valve and the pressure drop relation is a function of this set point.

7. A method as claimed in claim 1, wherein:

the pressure drop relation defining an effective surface area set point for the valve as a function of the pressure difference in a portion of the exhaust gas recirculation circuit including the EGR valve and of the burnt gas fraction set point in the intake manifold is used and then an effective valve surface area set point is expressed as an opening set point of the EGR valve from a map of the valve.

8. A method as claimed in claim 1, wherein:

the pressure drop relation is based on a Barré-Saint Venant relation, linearized for the pressure difference values $\Delta P$ at the level of the EGR valve that satisfy the inequality $\Delta P < 10\% P_{atm}$ with $P_{atm}$ being atmospheric pressure.

9. A method as claimed in claim 1, wherein:

the pressure difference in a portion of the exhaust gas recirculation circuit including the EGR valve is measured by at least one pressure detector positioned to be at least one of upstream and downstream from the EGR valve.

10. A method as claimed in claim 1, wherein:

the selection of the burnt gas fraction set point in the intake manifold is determined by an engine map resulting from a static calibration.

11. A combustion engine comprising: at least one cylinder, an intake manifold, a compressor for compressing intake air and a cooler for cooling compressed intake air and an exhaust gas recirculation circuit including an EGR valve which injects exhaust gas into the intake manifold upstream from the compressor and the cooler and is equipped with a pressure difference detector in a portion of the exhaust gas recirculation circuit including the EGR valve, wherein the engine includes a control for controlling the engine to measure a pressure difference at the EGR valve, to select a burnt gas fraction set point in the intake manifold, to calculate an opening set point for the EGR valve from a pressure drop relation in a portion of the exhaust gas recirculation circuit including the EGR valve, the pressure drop relation relating an opening of the EGR valve to the pressure difference in the portion of the exhaust gas recirculation circuit including the EGR valve and to the burnt gas fraction set point in the intake manifold and to control the EGR valve as a function of the opening set point of the EGR valve.

* * * * *